US010055642B2

(12) United States Patent
Gomez et al.

(10) Patent No.: US 10,055,642 B2
(45) Date of Patent: *Aug. 21, 2018

(54) STAREDOWN TO PRODUCE CHANGES IN INFORMATION DENSITY AND TYPE

(71) Applicant: Google LLC, Mountain View, CA (US)

(72) Inventors: Luis Ricardo Prada Gomez, Mountain View, CA (US); Alejandro Kauffmann, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,992

(22) Filed: Feb. 8, 2017

(65) Prior Publication Data

US 2017/0147880 A1 May 25, 2017

Related U.S. Application Data (63) Continuation of application No. 14/790,640, filed on Jul. 2, 2015, now Pat. No. 9,600,721, which is a
(Continued)

(51) Int. Cl.
*G06F 3/01* (2006.01)
*G06K 9/00* (2006.01)
(Continued)

(52) U.S. Cl.
CPC ..... *G06K 9/00604* (2013.01); *G02B 27/0172* (2013.01); *G06F 3/013* (2013.01);
(Continued)

(58) Field of Classification Search
CPC ...... G02B 2027/0138; G02B 2027/014; G02B 27/0172; G06F 3/013; G06K 9/00604; G06K 9/00671; H04N 5/2256; H04N 5/33
(Continued)

(56) References Cited

U.S. PATENT DOCUMENTS 5,151,722 A 9/1992 Massof et al.
6,118,888 A 9/2000 Chino et al.
(Continued)

OTHER PUBLICATIONS

Plopski et al, Corneal Imaging in Localization and HMD Interaction, Sep. 10-12, 2014.*

*Primary Examiner* — Shan E Elahi
(74) *Attorney, Agent, or Firm* — McDonnell Boehnen Hulbert & Berghoff LLP (57) ABSTRACT

A computer-implemented method includes detecting, at a wearable computing device, a first direction of a first stare, wherein the wearable computing device includes a head-mountable display unit, identifying a target based on the detected first direction, and based on a determination that a first time duration of the first stare is greater than or equal to a first predetermined time threshold, identifying information relevant to the target and displaying the identified information on the display unit. Subsequent to displaying the identified information, the method includes detecting a second stare that is directed at the target or at the displayed information, and based on a determination that a second time duration of the second stare is greater than or equal to a second predetermined time threshold, identifying additional information relevant to the target, and displaying the additional information on the display unit.

19 Claims, 9 Drawing Sheets

Related U.S. Application Data continuation of application No. 13/427,583, filed on Mar. 22, 2012, now Pat. No. 9,096,920.

(51) Int. Cl.
  *H04N 5/225* (2006.01)
  *H04N 5/33* (2006.01)
  *G02B 27/01* (2006.01)

(52) U.S. Cl.
  CPC ....... *G06K 9/00671* (2013.01); *H04N 5/2256* (2013.01); *H04N 5/33* (2013.01); *G02B 2027/014* (2013.01); *G02B 2027/0138* (2013.01)

(58) Field of Classification Search
  USPC .......................................... 348/78
  See application file for complete search history.

(56) References Cited

U.S. PATENT DOCUMENTS

| | | | |
|---|---|---|---|
| 6,345,111 B1 | 2/2002 | Yamaguchi et al. | |
| 6,396,509 B1 | 5/2002 | Cheng | |
| 6,753,828 B2 | 6/2004 | Tuceryan et al. | |
| 8,203,605 B1* | 6/2012 | Starner | G06F 1/163 348/115 |
| 8,228,315 B1 | 7/2012 | Starner et al. | |
| 8,235,529 B1 | 8/2012 | Raffle et al. | |
| 8,506,080 B2 | 8/2013 | Raffle et al. | |
| 8,854,452 B1 | 10/2014 | Raffle | |
| 8,893,164 B1 | 11/2014 | Teller | |
| 9,096,920 B1* | 8/2015 | Gomez | C23C 4/06 |
| 9,600,721 B2* | 3/2017 | Gomez | C23C 4/06 |
| 2001/0010225 A1 | 8/2001 | Keller | |
| 2002/0105484 A1 | 8/2002 | Navab et al. | |
| 2002/0113756 A1 | 8/2002 | Tuceryan et al. | |
| 2003/0030597 A1 | 2/2003 | Geist | |
| 2004/0113867 A1 | 6/2004 | Tomine et al. | |
| 2004/0196371 A1 | 10/2004 | Kono et al. | |
| 2006/0197832 A1 | 9/2006 | Yamada et al. | |
| 2007/0273610 A1 | 11/2007 | Baillot | |
| 2008/0148147 A1 | 6/2008 | Poston et al. | |
| 2009/0073082 A1 | 3/2009 | Yoshikawa | |
| 2009/0225001 A1* | 9/2009 | Biocca | G02B 27/0172 345/8 |
| 2010/0002154 A1 | 1/2010 | Hua | |
| 2010/0074333 A1* | 3/2010 | Au | H04N 19/51 375/240.12 |
| 2010/0156617 A1 | 6/2010 | Nakada et al. | |
| 2010/0194862 A1 | 8/2010 | Givon | |
| 2010/0240988 A1 | 9/2010 | Varga et al. | |
| 2010/0289632 A1* | 11/2010 | Seder | G01S 13/723 340/436 |
| 2010/0309287 A1 | 12/2010 | Rodriguez | |
| 2011/0012814 A1 | 1/2011 | Tanaka | |
| 2011/0043644 A1 | 2/2011 | Munger et al. | |
| 2011/0075257 A1 | 3/2011 | Hua et al. | |
| 2011/0080496 A1 | 4/2011 | Givon | |
| 2011/0221657 A1 | 9/2011 | Haddick et al. | |
| 2012/0050493 A1* | 3/2012 | Ernst | G02B 27/017 348/47 |
| 2012/0062445 A1* | 3/2012 | Haddick | G02B 27/017 345/8 |
| 2012/0120070 A1 | 5/2012 | Baillot | |
| 2012/0287123 A1* | 11/2012 | Starner | G06F 1/163 345/419 |
| 2013/0135204 A1 | 5/2013 | Raffle et al. | |
| 2013/0257709 A1* | 10/2013 | Raffle | G06F 3/013 345/156 |
| 2013/0300652 A1 | 11/2013 | Raffle et al. | |
| 2013/0318776 A1* | 12/2013 | Jacobs | G02B 27/0129 29/592.1 |
| 2014/0368980 A1 | 12/2014 | Nanavati et al. | |

* cited by examiner

STAREDOWN TO PRODUCE CHANGES IN INFORMATION DENSITY AND TYPE

PRIORITY CLAIM

This application is a continuation of pending U.S. patent application Ser. No. 14/790,640, filed Jul. 2, 2015, which is a continuation of U.S. patent application Ser. No. 13/427,583, filed Mar. 22, 2012, both of which are incorporated by reference herein in their entirety and for all purposes.

BACKGROUND

Unless otherwise indicated herein, the materials described in this section are not prior art to the claims in this application and are not admitted to be prior art by inclusion in this section.

A head mounted display (HMD) unit is a display device, worn on a user's head, which can display information via images in front of one eye (monocular HMD unit) or each eye (binocular HMD unit) of the user. HMD units have been used for a wide range of applications.

HMD units, also referred to as wearable systems, can integrate various elements, such as miniaturized computers, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems and miniaturized optical elements, it has become possible to consider wearable compact optical displays that augment the wearer's experience of the real world.

By placing an image display unit close to the user's eye(s), an artificial image can be made to overlay the wearer's view of the real world. The wearable systems incorporating these image display units also referred to as "near-eye see-through displays", or "heads-up displays" (HUDs). Depending upon the size of the display unit and the distance to the wearer's eye, the artificial image may fill or nearly fill the user's field of view.

SUMMARY

In one embodiment, a computer-implemented method includes detecting, at a wearable computing device, a first direction of a first stare, wherein the wearable computing device includes a head-mountable display unit, identifying a target based on the detected first direction, and based on a determination that a first time duration of the first stare is greater than or equal to a first predetermined time threshold, identifying information relevant to the target and displaying the identified information on the display unit. Subsequent to displaying the identified information, the method includes detecting a second stare that is directed at the target or at the displayed information, and based on a determination that a second time duration of the second stare is greater than or equal to a second predetermined time threshold, identifying additional information relevant to the target, and displaying the additional information on the display unit.

In another embodiment, a computer-implemented method includes detecting, at a wearable computing device, a direction of a stare, wherein the wearable computing device includes a head-mountable display unit, identifying a target based on the detected direction, and based on a determination that a first time duration of the stare is greater than or equal to a first predetermined time threshold, identifying information relevant to the target and displaying the identified information on the display unit. Subsequent to displaying the identified information, the method further includes determining that a second time duration of the stare is greater than or equal to a second predetermined time threshold, and based on a determination that the second time duration of the stare is greater than or equal to the second predetermined time threshold, identifying additional information relevant to the target, and displaying the additional information on the display unit.

In another embodiment, a head-wearable display device includes an eye tracking unit for determining a stare behavior, a display unit for displaying graphical images, an image projecting unit for projecting the graphical images on the display unit, a memory unit storing program instructions for producing changes in information density and type on the display unit, and a processor operatively coupled to the eye tracking unit, the memory, and the image projecting unit, and configured to execute the program instructions.

In another embodiment, a non-transitory computer readable storage medium contains instructions that cause a computing system to perform the method for producing changes in information density and type on the display unit.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the invention by way of example only and not by way of limitation.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

In one embodiment, a computing system is configured to image at least one eye of a wearer of a head mounted display or device ("HMD") in order to determine a stare direction within a field of view of the HMD. The HMD may be any suitable device that is capable of being worn or mounted on a user's or wearer's head. That is, to determine stare directions one or both eyes of the wearer of the HMD could be imaged. From the determined stare direction, stare locations may be determined that could correspond to locations where the HMD wearer may be looking within the display area or in the real world. The wearer's stare may be directed at a target that figures on a display presented on the HMD. Alternatively, the wearer's stare may be directed at a target that is located within the real world seen through a see-through display unit of the HMD.

Exemplary methods and systems may be configured upon detection of a user's stare at a target for a predetermined time to display information related to the target. Further, following the display of the information and upon determination that the user continues staring at the target for at least another predetermined time, additional information related to the target is displayed. As such, a computing system, including an eye tracking system, is configured to provide a progressive display of additional information about the target as the user keeps staring as the target, i.e., the longer the user stares the more information about the target is displayed. Alternatively, upon detection that the user has been staring at the displayed target information, rather than at the target, for at least another predetermined time, the computing system provides additional information related to the target. The information related to the target may be retrieved from a database integral to the HMD and/or from a remote server. The additional information may build on or may be related to the initial information in order to provide further details about a certain feature or features of the target.

In one embodiment, the HMD wearer's stares, deliberate or unconscious, may include: a dwelling of the wearer's eyes over a small area of interest, prolonging reading movements over a certain area, squinting, changes in pupil dilations, changes in eye lens accommodation, repeated looks at an area of interest, or other behaviors detectable by the eye-tracking system. Once the eye tracking system has detected a long staring behavior at the target, a system processor may be configured to vary or modify the display in a variety of ways, such as for example:

Burning away a layer of information to reveal more details.

X-raying a top layer of information to reveal settings or other options relevant to the top layer of information.

Providing additional content relevant to the stared-at target, for example, fading in time of an e-mail when the eye-tracking system detects that the wearer has been reading the subject line repeatedly.

Certain illustrative examples of a system and method for producing changes in information density and type in a display area of a HMD based on eye stare information are described below. It is to be understood, however, that other embodiments are possible and are implicitly considered within the context of the following example embodiments.

2. Head-Mounted Display Apparatus with Eye Tracking for Interaction with a User Interface The HMD may enable the user or wearer to observe the wearer's real-world surroundings and also view a displayed image, such as a computer-generated image or virtual image. In some cases, the displayed image may overlay a portion of the wearer's field of view of the real world. Thus, while the wearer of the HMD is going about his or her daily activities, such as walking, driving, exercising, etc., the wearer may be able to see a displayed image generated by the HMD at the same time that the wearer is looking out at his or her real-world surroundings.

The displayed image might include, for example, graphics, text, and/or video. The content of the displayed image may relate to any number of contexts, including but not limited to the wearer's current environment, an activity in which the wearer is currently engaged, the biometric status of the wearer, and any audio, video, or textual communications that have been directed to the wearer. The images displayed by the HMD may also be part of an interactive user interface. For example, the HMD could be part of a wearable computing device. Thus, the images displayed by the HMD could include menus, selection boxes, navigation icons, or other user interface features that enable the wearer to invoke functions of the wearable computing device or otherwise interact with the wearable computing device.

The images displayed by the HMD could appear anywhere in the wearer's field of view. For example, the displayed image might occur at or near the center of the wearer's field of view, or the displayed image might be confined to the top, bottom, or a corner of the wearer's field of view. Alternatively, the displayed image might be at the periphery of or entirely outside of the wearer's normal field of view. For example, the displayed image might be positioned such that it is not visible when the wearer looks straight ahead but is visible when the wearer looks in a specific direction, such as up, down, or to one side. In addition, the displayed image might overlay only a small portion of the wearer's field of view, or the displayed image might fill most or all of the wearer's field of view.

The virtual images could be displayed based on the position and orientation of the HMD. For example, the HMD may include position and orientation sensors so that when the user moves his or her head, data regarding the position and orientation of the HMD can be received by the processor. The HMD may additionally include a display controllable by the processor, so when the user moves his or her head, the processor may adjust the displayed image on the display. In particular, the displayed image may move in the opposite direction of head movement to create the sensation of looking around a world with superimposed virtual images.

Alternatively, in case the HMD moves relatively to the eyes of the wearer, the processor is configured to adjust a location, a size, and a focus of the displayed image so as to stabilize the displayed image relative to the eyes of the wearer.

As stated above and known to one of ordinary skill in the art, a stare or staredown is a fixed and intent look, and may be determined upon detection of a lengthy visual fixation or of a number of consecutive fixations at a target. As a difference to just looking at a display in an observational mode, the staredown involves looking at the display in an intentional mode. As such, the eye tracking system can be configured to detect and measure the following characteristics of the staredown: location, duration, and repeated fixations.

By incorporating an eye-tracking system into the HMD, stares or staredowns at the displayed image or through the display unit may be determined. That is, the eye-tracking system in combination with the HMD may determine where the wearer of the HMD is looking at, detect staredown behaviors, and dynamically adjust information or provide additional information presented on the display unit as a result based on the length of the stare. Staredown behaviors may also be unconscious actions that accompany increased attention.

In one embodiment, staring down intently at a target found in the displayed image for a predetermined period of time may result in that target being selected by the system, and information related/relevant to the target may be searched and displayed on the display unit of the HMD. Moreover, when the system determines that the user's stare has lasted more than the predetermined period of time, then additional information relevant to the target may be displayed. In another embodiment, the target being stared at may be seen through the display unit and located in a certain area of the visible real-world surroundings. Thus, the length of the detected stares may act as input instructions that can cause the processor to increase information displayed.

Figure 1:
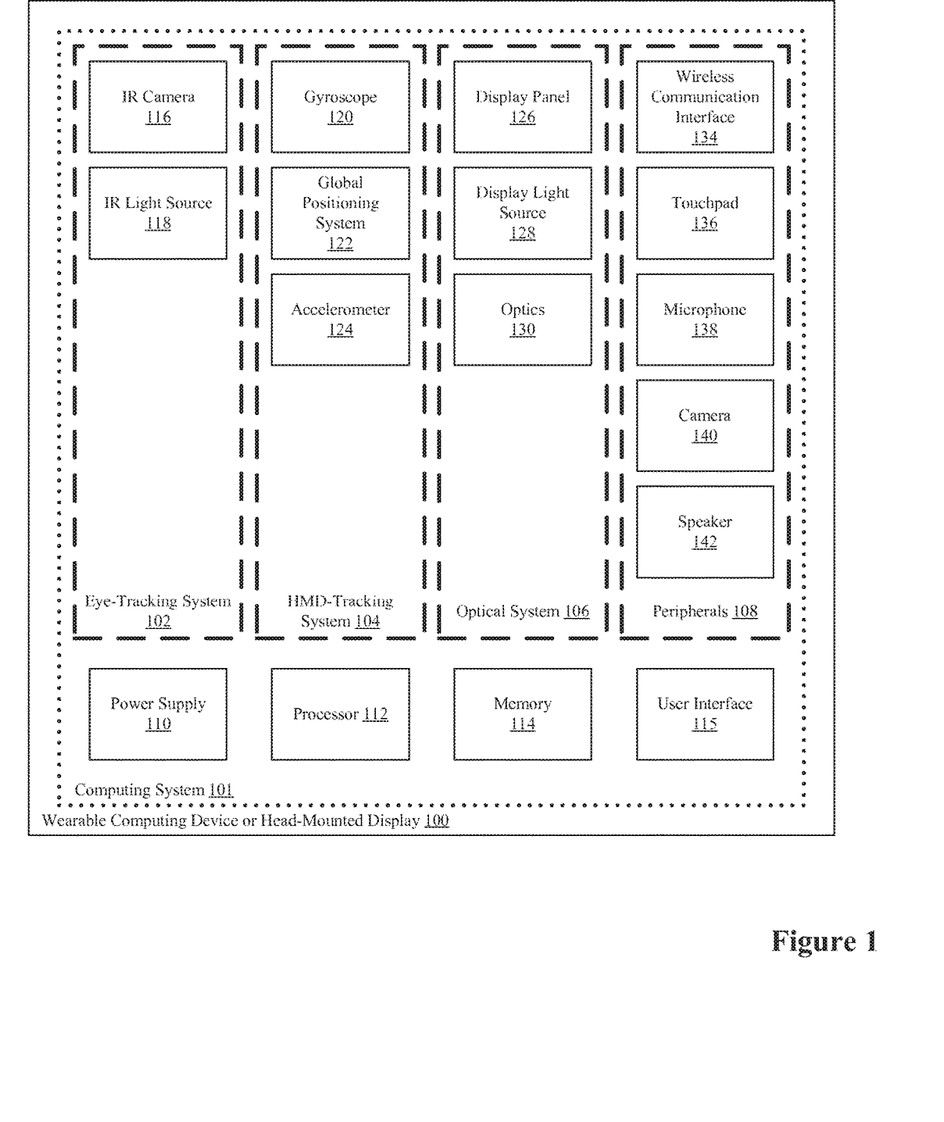
FIG. 1 is a schematic diagram of a wearable computing device, in accordance with an example embodiment.

FIG. 1 is a schematic diagram of a wearable computing device or a head-mounted display (HMD) 100 that may include several different components and subsystems. As shown, the HMD 100 includes a computing system 101, which may include an eye-tracking system 102, a HMD-tracking system 104, an optical system 106, peripherals 108, a power supply 110, a processor 112, a memory 114, and a user interface 115. Eye-tracking system 102 may include hardware such as an infrared camera 116 and at least one infrared light source 118. HMD-tracking system 104 may include a gyroscope 120, a global positioning system (GPS) 122, and an accelerometer 124. Optical system 106 may include, in one embodiment, a display unit or panel 126, a display light source 128, and optics 130. Peripherals 108 may include a wireless communication interface 134, a touchpad 136, a microphone 138, a camera 140, and a speaker 142.

In an example embodiment, HMD 100 includes a see-through display. Thus, the wearer of HMD 100 may observe a portion of the real-world environment, i.e., in a particular field of view provided by optical system 106. In the example embodiment, HMD 100 is operable to display virtual images that are superimposed on the field of view, for example, to provide an "augmented reality" experience. Some of the virtual images displayed by HMD 100 may be superimposed over particular objects in the field of view. HMD 100 may also display images that appear to hover within the field of view instead of being associated with particular objects in the field of view. Alternatively, virtual images could be displayed independently from the real-world environment.

Components of computing system 101 may be configured to work in an interconnected fashion with other components within or outside their respective systems. For instance, in an example embodiment, infrared camera 116 may image one or both of the HMD wearer's eyes. Infrared camera 116 may deliver image information to processor 112, which may access memory 114 and make a determination regarding the direction of the HMD wearer's stare, also termed a stare axis. Processor 112 may further accept input from GPS unit 122, gyroscope 120, and/or accelerometer 124 to determine the location and orientation of HMD 100.

HMD 100 could be configured as, for example, eyeglasses, goggles, a helmet, a hat, a visor, a headband, or in some other form that can be supported on or from the wearer's head. Further, HMD 100 may be configured to display images to both of the wearer's eyes, for example, using two see-through displays. Alternatively, HMD 100 may include only a single see-through display and may display images to only one of the wearer's eyes, either the left eye or the right eye. HMD 100 may also represent an opaque display configured to display images to one or both of the wearer's eyes without a view of the real-world environment. Further, HMD 100 could provide an opaque display for a first eye of the wearer as well as provide a view of the real-world environment for a second eye of the wearer.

A power supply 110 may provide power to various HMD components and could represent, for example, a rechargeable lithium-ion battery. Various other power supply materials and types known in the art are possible.

The functioning of computing system 101 may be controlled by processor 112 that executes instructions stored in a non-transitory computer readable medium, such as memory 114. Thus, processor 112 in combination with instructions stored in memory 114 may function as a controller of computing system 101. As such, processor 112 may control user interface 115 to adjust the images displayed by HMD 100. Processor 112 may also control wireless communication interface 134 and various other components of computing system 101. Processor 112 may additionally represent a plurality of computing devices that may serve to control individual components or subsystems of the HMD 100 in a distributed fashion.

In addition to instructions that may be executed by processor 112, memory 114 may store data that may include a set of calibrated wearer eye pupil positions and a collection of past eye pupil positions. Thus, memory 114 may function as a database of information related to stare direction. Such information may be used by computing system 101 to anticipate where the user will look and determine what images are to be displayed to the wearer. Calibrated wearer eye pupil positions may include, for instance, information regarding the extents or range of the wearer's eye pupil movement (right/left and upwards/downwards) as well as wearer eye pupil positions that may relate to various reference axes.

Reference axes could represent, for example, an axis extending from a viewing location, such as one eye of the user, and through a target object or the apparent center of a field of view (i.e. a central axis that may project through a center point of the apparent display panel of HMD 100). Other possibilities for reference axes may exist. Thus, a reference axis may further represent a basis for determining a stare down direction.

In addition, information may be stored in memory 114 regarding possible control instructions that may be enacted via deliberate or unconscious eye movements, described above. Control instructions could be based on dwell-based selection of a target. For instance, if a wearer fixates visually upon a particular virtual image or real-world object for longer than a predetermined time period, a control instruction may be generated to select the virtual image or real-world object as a target object. Many other control instructions are possible.

In an example embodiment, user interface 115 is configured to provide information to the wearer or receiving input from the wearer. User interface 115 could be associated with, for example, the displayed virtual images and/or one or more input devices in peripherals 108, such as touchpad 136 or microphone 138. Processor 112 may control the functioning of computing system 101 based on inputs received through user interface 115. For example, processor 112 may utilize user input from user interface 115 to control how computing system 101 displays images within a field of view or to determine what images computing system 101 displays.

Figure 2A:
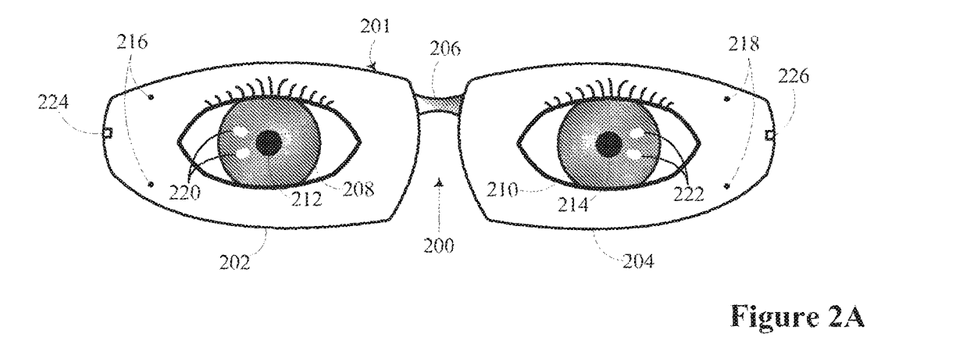
FIG. 2A is a front view of a head-mounted display (HMD), in accordance with an example embodiment.

In an example embodiment, eye-tracking system 102 may deliver information to processor 112 regarding the eye position of a wearer of HMD 100. The eye-tracking data can be used, for instance, to determine a direction in which the HMD wearer may be staring. Processor 112 may determine targets among the displayed images or from the real-world seen through the display unit based on information from eye-tracking system 102. Processor 112 may control user interface 115 and display panel 126 to produce and display new information related to a target, which is subject of a stare by the wearer, on the original display that includes the target. Alternatively, the new information may be displayed on lens 204 while the target is displayed on lens 202. Further, original displays and new information displays may be presented to the wearer in various ways.

Infrared camera 116 may be utilized by the eye-tracking system 102 to capture images of a viewing location associated with HMD 100. Thus, infrared camera 116 may image the eye of a HMD wearer that may be located at the viewing location. The images could be either video images or still images. The images obtained by infrared camera 116 regarding the HMD wearer's eye may help determine where the wearer is looking, i.e., a viewing direction, within the HMD field of view, for instance by allowing processor 112 to ascertain the location of the HMD wearer's eye pupil. Analysis of the images obtained by infrared camera 116 could be performed by processor 112 in conjunction with memory 114.

The imaging of the viewing location could occur continuously or at discrete times depending upon, for instance, user interactions with user interface 115. Infrared camera 116 could be integrated into optical system 106 or mounted on HMD 100. Alternatively, infrared camera 116 could be positioned apart from HMD 100 altogether. Furthermore, infrared camera 116 could additionally represent a conventional visible light camera with sensing capabilities in the infrared wavelengths.

Infrared light source 118 could represent one or more infrared light-emitting diodes (LEDs) or infrared laser diodes that may illuminate a viewing location. One or both eyes of a wearer of HMD 100 may be illuminated by infrared light source 118. Infrared light source 118 may be positioned along an optical axis common to infrared camera 116, and/or infrared light source 118 may be positioned elsewhere. Infrared light source 118 may illuminate the viewing location continuously or may be turned on at discrete times. Additionally, when illuminated, infrared light source 118 may be modulated at a particular frequency. Other types of modulation of infrared light source 118 are possible.

HMD-tracking system 104 could be configured to provide a HMD position and a HMD orientation to processor 112. This position and orientation data may help determine a central axis to which a stare axis is compared. For instance, the central axis may correspond to the orientation of HMD 100.

Gyroscope 120 could be a micro-electromechanical system (MEMS) gyroscope, a fiber optic gyroscope, or another type of gyroscope known in the art. Gyroscope 120 may be configured to provide orientation information to processor 112. GPS unit 122 could be a receiver that obtains clock and other signals from GPS satellites and may be configured to provide real-time location information to processor 112.

HMD-tracking system 104 could further include an accelerometer 124 configured to provide motion input data to processor 112.

Optical system 106 could include components configured to provide virtual images at a viewing location. The viewing location may correspond to the location of one or both eyes of a wearer of HMD 100. These optical system components 126, 128, and 130, introduced above, may be optically and/or electrically-coupled to one another and may be configured to provide viewable images at a viewing location. As mentioned above, one or two optical systems 106 could be provided in a HMD apparatus. In other words, the HMD wearer could view virtual images in one or both eyes, as provided by one or more optical systems 106. Also, as described above, optical system(s) 106 could include an opaque display and/or a see-through display, which may allow a view of the real-world environment while providing superimposed virtual images.

Various peripheral devices 108 may be included in HMD 100 and may serve to provide information to and from a wearer of HMD 100. In one example, HMD 100 may include a wireless communication interface 134 for wirelessly communicating with one or more devices directly or via a communication network. For example, wireless communication interface 134 could use 3G cellular communication, such as CDMA, EVDO, GSM/GPRS, or 4G cellular communication, such as WiMAX or LTE. Alternatively, wireless communication interface 134 could communicate with a wireless local area network (WLAN), for example, using WiFi. In some embodiments, wireless communication interface 134 could communicate directly with a device, for example, using an infrared link, Bluetooth, or ZigBee. Wireless communication interface 134 could interact with devices that may include, for example, components of HMD 100 and/or externally-located devices.

Although FIG. 1 shows various components of HMD 100 (i.e., wireless communication interface 134, processor 112, memory 114, infrared camera 116, display panel 126, GPS 122, and user interface 115) as being integrated into HMD 100, one or more of these components could be physically separate from HMD 100. For example, infrared camera 116 could be mounted on the wearer separate from HMD 100. Thus, HMD 100 could be part of a wearable computing device in the form of separate devices that can be worn on or carried by the wearer. The separate components that make up the wearable computing device could be communicatively coupled together in either a wired or wireless fashion.

Figure 2B:
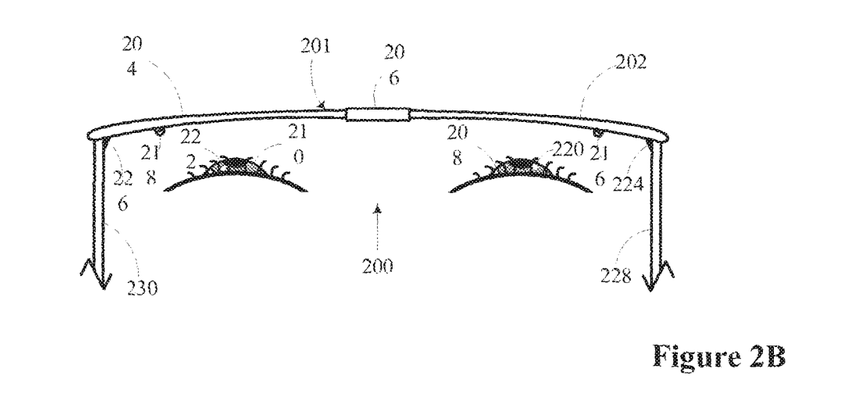
FIG. 2B is a top view of the head-mounted display (HMD) of FIG. 2A, in accordance with an example embodiment.
Figure 2C:
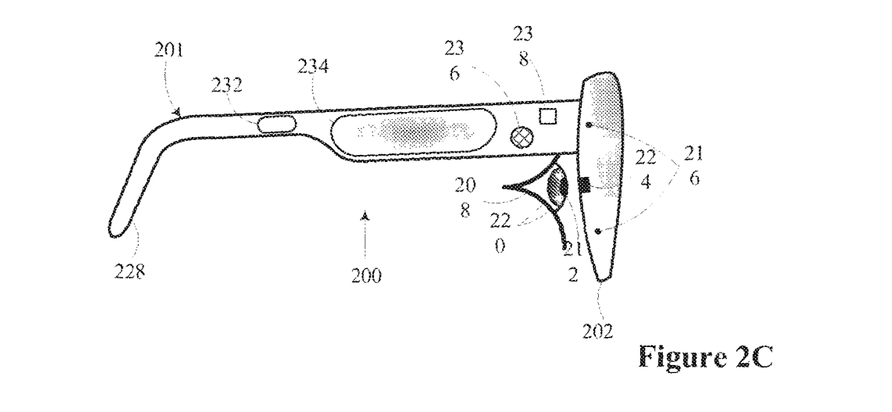
FIG. 2C is a side view of the head-mounted display (HMD) of FIG. 2A and FIG. 2B, in accordance with an example embodiment.

FIG. 2A presents a front view of a head-mounted display (HMD) 200 in an example embodiment that includes a head-mounted support 201. FIGS. 2B and 2C present the top and side views, respectively, of the HMD in FIG. 2A. Although this example embodiment is provided in an eyeglasses format, it will be understood that wearable systems and HMDs may take other forms, such as hats, goggles, masks, headbands and helmets. Head-mounted support 201 includes a center frame support 206, lens elements 202 and 204, and extending side-arms 228 and 230. Center frame support 206 and side-arms 228 and 230 are configured to secure head-mounted support 201 to the wearer's head via the wearer's nose and ears, respectively. Center frame support 206 and extending side-arms 228 and 230 may be formed of a solid structure of plastic or metal, or may be formed of a hollow structure of similar material so as to allow wiring and component interconnects to be internally routed through the head-mounted support 201. Alternatively or additionally, head-mounted support 201 may support external wiring. Lens elements 202 and 204 are at least partially transparent so as to allow the wearer to look through them. In particular, wearer's left eye 210 may look through left lens 204 and the wearer's right eye 208 may look through right lens 202. One or more optical systems configured to display images to a HMD wearer could be incorporated into or associated with right lens 202 and left lens 204 so that the HMD wearer could observe overlaid virtual images on a field of view of the real-world environment. Other ways of using optical systems for use as heads up displays (HUDs) or HMDs are known in the art.

Although this example embodiment includes an optical system for each of the wearer's eyes, it is to be understood that an HMD might include an optical system for only one of the wearer's eyes (either left eye 210 or right eye 208). In this example embodiment, right lens 202 and left lens 204 may act as respective attachment locations for light sources 216 and 218 as well as for cameras 224 and 226. Light sources 216 and 218 may illuminate viewing location(s) 208 and 210, i.e. the wearer's eye(s), and may produce glint reflections from the eyes 208 and 210 that may appear as bright glints 220 and 222, respectively, in the wavelength range of illumination. The number of light sources like light sources 216 and 218 may vary. Cameras 224 and 226 may be infrared cameras, and may image eyes 208 and 210, eye pupils 212 and 214, and glints 220 and 222, respectively.

HMD 200 may include various elements such as a processor 232, a touchpad 234, a microphone 236, and a button 238. Processor 232 may use data from, among other sources, various sensors and cameras to determine the virtual image that should be displayed to the user. Further, light sources 216 and 218 may represent one or more LEDs located at different locations in, and/or separate from, right lens 202 and left lens 204, respectively. The images of glints 220 and 222 may be transmitted to processor 232, which may accordingly determine a stare direction of a wearer of the HMD from the relative and absolute locations of glints 220 and 222. Processor 232 may also determine a stare point location, which may correspond to where the HMD wearer may be staring at on the display area of HMD 200. The stare point locations could be determined by, for instance, the intersection of the physical or apparent display area and the stare direction. These stare point locations (or more directly, stare locations) may be used by processor 232 to determine input instructions that could correspond to various functions, for instance, to increase the amount or type of information displayed once the user has shown interest in a particular target or piece of information, which is either displayed in an area of the display unit of HMD 200 or a visible through the see-through display unit.

Thus, light sources 216 and 218, cameras 224 and 226, and processor 232 may function as a stare-acquisition system for determining staring directions from images acquired by cameras 224 and 226 and for determining stare locations based on where the stare directions. Additionally, depending upon the particular embodiment, it may be the case that a stare-acquisition system is made available to one eye of the HMD wearer and not to both eyes of the HMD wearer.

Those skilled in the art will understand that other user input devices, user output devices, wireless communication devices, sensors, and cameras may be reasonably included in such a wearable computing system.

3. A Method for Using Eye-Tracking Data to Produce Changes in Information Density and Type.

Figure 3:
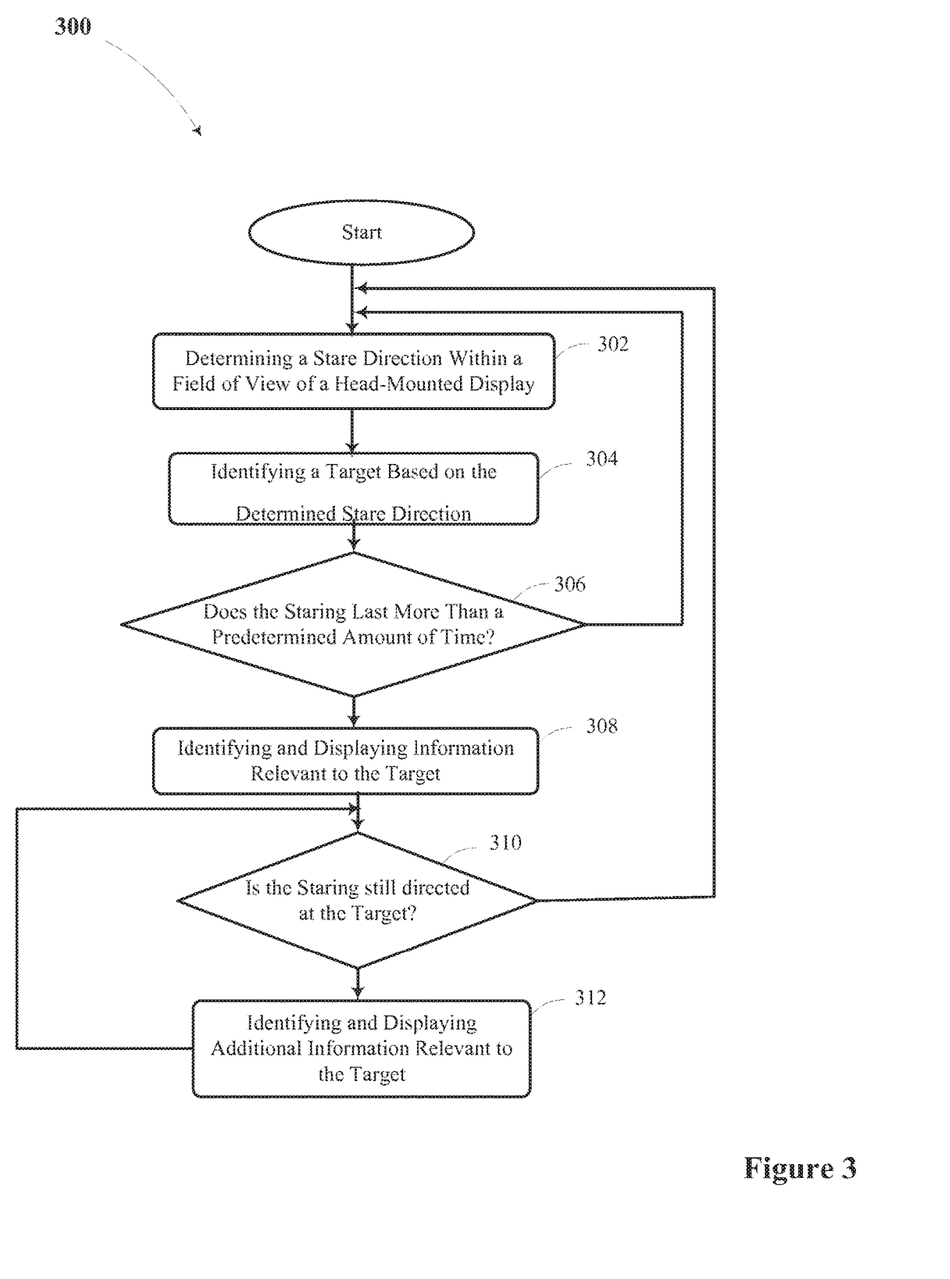
FIG. 3 is a flowchart of a method, in accordance with an example embodiment.

An example method 300 is provided for producing changes in information density and type about a target displayed on or visible through HMD 100 and 200 based on eye-tracking data. The information changes may be performed using the apparatus shown in FIGS. 1-2C and described above; however, other configurations could be used. FIG. 3 illustrates the steps in example method 300, however, it is understood that in other embodiments, the steps may appear in different order and steps may be added or subtracted.

At step 302, computing system 101 is configured to image at least one eye of the wearer in the manner discussed above in order to determine a stare direction within a field of view of HMD 100, which includes display unit 126 that may be a see-through unit. That is, to determine stare directions one or both eyes of the wearer of HMD 100 and 200 could be imaged. Specifically, infrared camera 116, 224 and 226 and one or more infrared light sources 118, 216 and 218 could be used to acquire images of the HMD wearer's eye(s). These images could be sent to processor 112. As discussed above, processor 112 could determine a stare direction from the glint locations on the HMD wearer's eye(s). From the determined stare direction, stare locations may be determined that could correspond to locations where the HMD wearer may be looking at within the display area or at the real world. Based on the imaging of at least one eye of the wearer, computing system 101 may also be configured to determine a stare depth. The wearer's stare may have been directed at a target that figures on a display presented on one of lenses 202 and 204. In this case, the depth is determined to be substantially equal to a distance separating the display from the wearer's eyes. Alternatively, the wearer's stare may have been directed at a target that is located within the real world seen through the see-through lenses 202 and 204, and the determined depth is thus greater than the distance separating the see-through lenses 202 and 204 from the wearer's eyes.

At step 304, computing system 101 is configured to identify the target of interest and may be an environment of the target of interest based on the stare direction and the stare depth. In case, the target of interest is part of the display, then the context is already known to processor 112. Alternatively, in case the target is located in the real world facing/surrounding the wearer, then computing system 101 is configured to identify the wearer's surroundings by extracting its image from the imaging of at least one eye of the wearer and from GPS data provided by GPS 122, and comparing it to environment data stored in a database associated with memory 114 and/or in a database stored in a remote server (not shown) accessible via wireless communication interface 134. Alternatively, the remote server may be accessible via a wired connection.

At step 306, once the target has been identified, computing system 101 is configured to determine a length of time during which the user has been staring at the identified target, and to compare the determined length of time to a predetermined stare time threshold. Upon a determination that the user's stare lasted more than the predetermined stare time threshold, computing system 101 is configured to identify information relevant to the target. Computing system 101 is then configured to display the identified information over either a displayed image containing the identified target or on a different area than that of the displayed image, at step 308. In case the target is located in the real world, the identified information may be displayed on display unit 126 over a portion of the view of the real world.

Figure 4A:
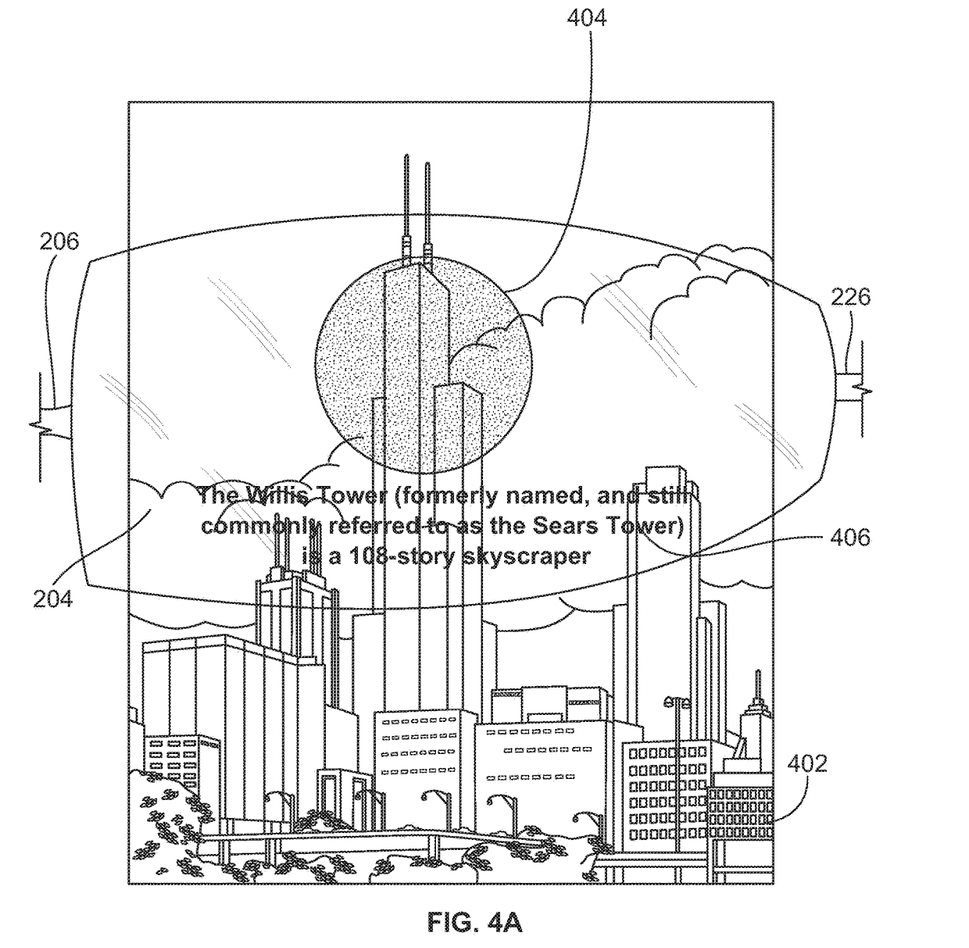
FIGS. 4A-4C collectively depict changes in information density and type on an HMD, in accordance with an example embodiment.
Figure 4B:
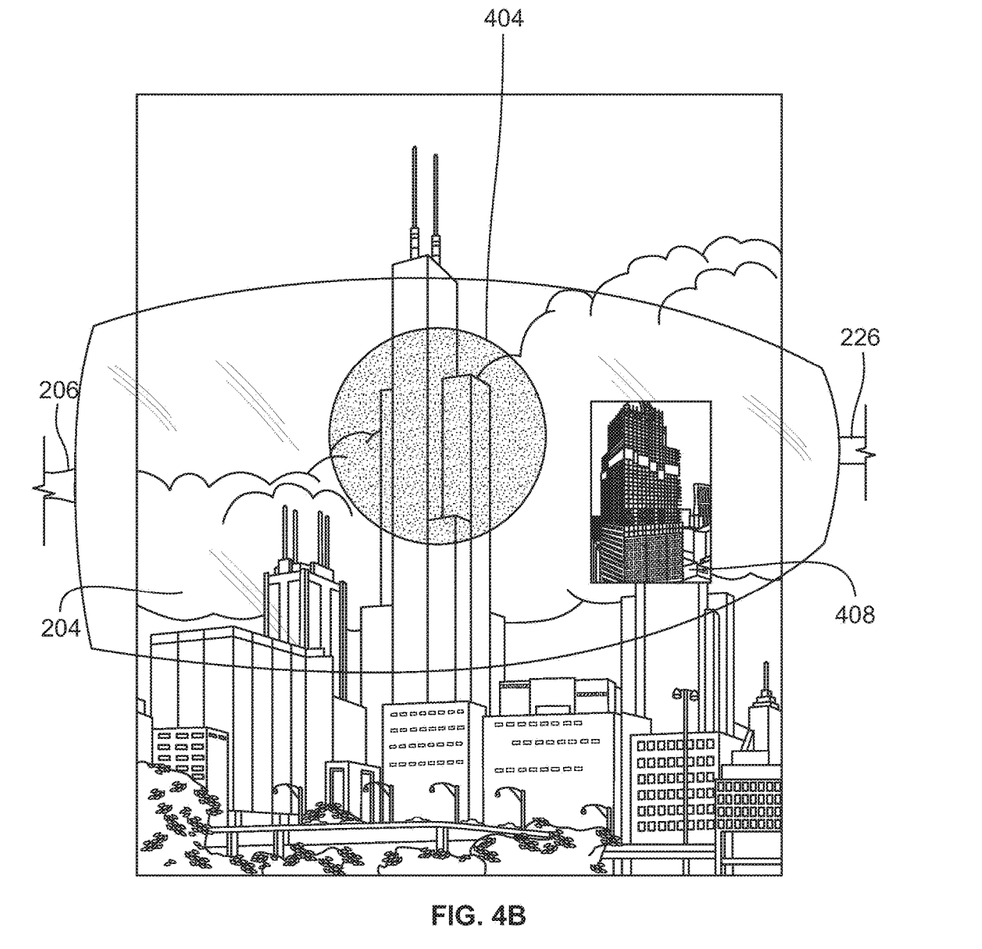
Figure 4C:
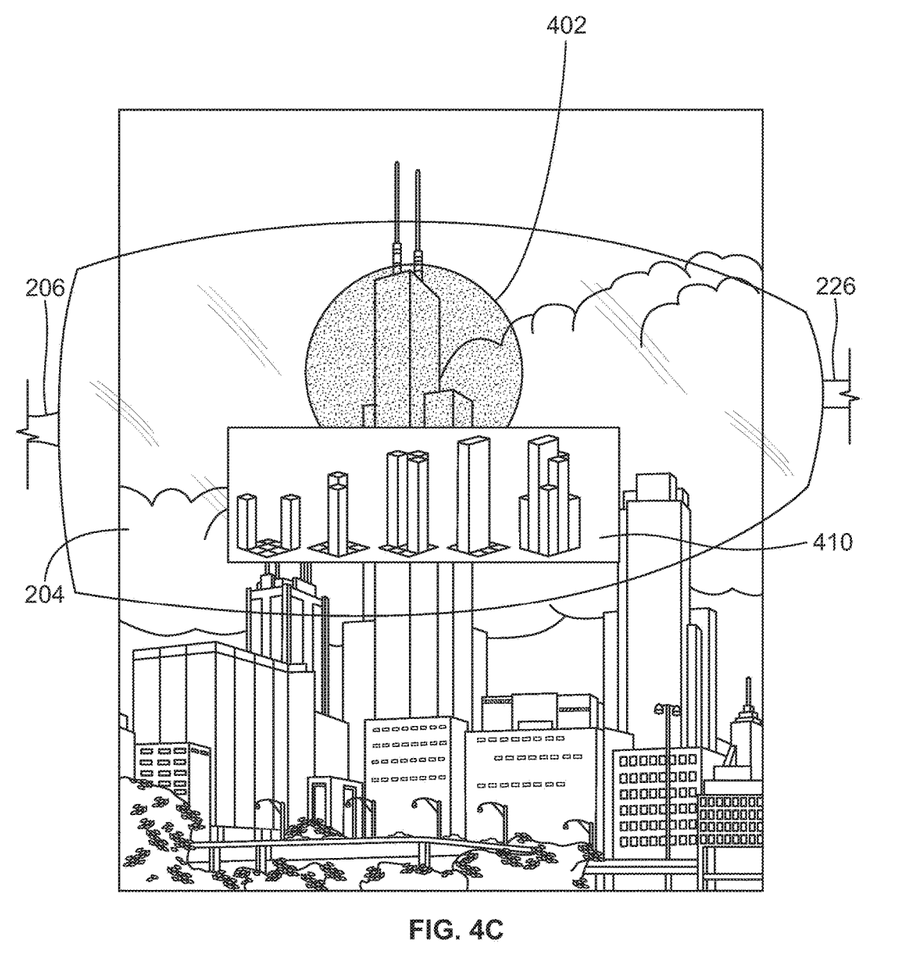

FIGS. 4A-4C collectively depict an example of a progressive increase in the amount of information displayed once the wearer has shown interest at a target through a stare, and keeps on staring after each additional information display. The target may be a particular piece of information or a physical object. In particular, FIGS. 4A-4C illustrate how the longer the wearer's stare lasts the more information or details computing system 101 identifies and presents on display unit 126. Many other embodiments are possible and the described example embodiments are not meant to limit the ways in which computing system 101 can identify targets of interest and provide related information.

In FIG. 4A, an example embodiment of an HMD wearer in a stare-based interaction with a work of art is shown. The work of art may be a painting or photograph of a portion of the city of Chicago, Ill. As illustrated, the HMD wearer is positioned in front of the city of Chicago painting 402, and looking at it through lens 204. While looking at painting 402, the wearer's eyes are in a position that permits camera 116 of eye tracking system 102 to track their movements and determine when a staring behavior occurs. As described above, a stare point location may be determined from camera images of the HMD wearer's eye(s). Specifically, the stare point location may correspond to the intersection between the physical or apparent display area and the stare direction, which can be determined from the location of glints on the HMD wearer's eye(s).

Referring back to FIG. 4A, when the wearer directs his/her eye and stares at an area of interest 404 within painting 402, the eye movement information obtained by eye tracking system 102 is used to determine area of interest 404, which includes the Willis Tower for example, and provides an image of area of interest 404 to processor 112. If the wearer's stare is determined to last longer than a certain length of time T1, the Willis Tower is identified and related information 406 is retrieved by processor 112 from memory 114 or from a database associated with a remote server accessible via wireless interconnection interface 134, and projected/presented on lens 204. Alternatively, Willis Tower information may be presented on lens 202. This information may include historical data of the Willis Tower, such as its height, and its previous name, i.e., Sears Tower. Alternatively, the retrieved information may also include its inauguration date, and when it lost its title as the tallest building in the world.

Following the presentation of the retrieved information about the Willis Tower, computing system 101 determines whether the wearer continues staring at the Willis Tower, at step 310. If the continued stare is determined to last longer than another length of time T2 subsequently to length of time T1, computing system 101 is configured to identify additional information relevant to the Willis Tower. The additional information may include more details about the Willis Tower, such as a portion of its architectural structure as depicted in an image 408 shown in FIG. 4B. Computing system 101 is then configured to display image 408 on either lens 202 or 204 or on both, at step 312. In one embodiment, the stare times T1 and T2 may not be contiguous. That is, a second stare at the Willis Tower need not be contiguous to a first stare at the Willis Tower.

Still referring to FIG. 3, following the presentation of the additional information about the Willis Tower, computing system 101 determines whether the wearer still continues to stare at the Willis Tower, at step 310. If the continued stare is determined to last longer than another length of time T3 subsequently to length of time T2, computing system 101 is configured to identify extra information relevant to the Willis Tower. The extra information may include still more details about the Willis Tower, such as its bundled-tube structural design for example as depicted in an image 410 shown in FIG. 4B. Computing system 101 is then configured to display image 410 on either lens 202 or 204 or on both, at step 312. As such, the longer the gaze at a particular target the more information about the particular target are identified and presented to the HMD wearer.

In one embodiment, following the presentation of the retrieved information about the Willis Tower, the wearer may continue staring at the displayed retrieved information rather than redirecting his/her stare back at the Willis Tower or at another target. If the stare at the displayed information is determined to last longer than another predetermined length of time, computing system 101 is configured to identify additional information relevant to the Willis Tower that may build on or may be related to the displayed information in order to provide additional details about a certain feature or features of the target.

In another embodiment, information that can be retrieved about a target may be arranged and stored as a list of information items. Each of these information items may build on or may be related to one or more of the other information items. During operation, computing system 101 may cycle through the list of information items to display them in sequence as the stare continues. As such, with each subsequent stare or as the same staredown lengthens the last displayed information item is moved or shifted to the back of the list while the topmost information item of the list replaces the last displayed information item on either lens 202 or 204 or on both. Thus, this combination of shifting and displaying of information items may last as long as the wearer continues staring at the target.

Figure 5A:
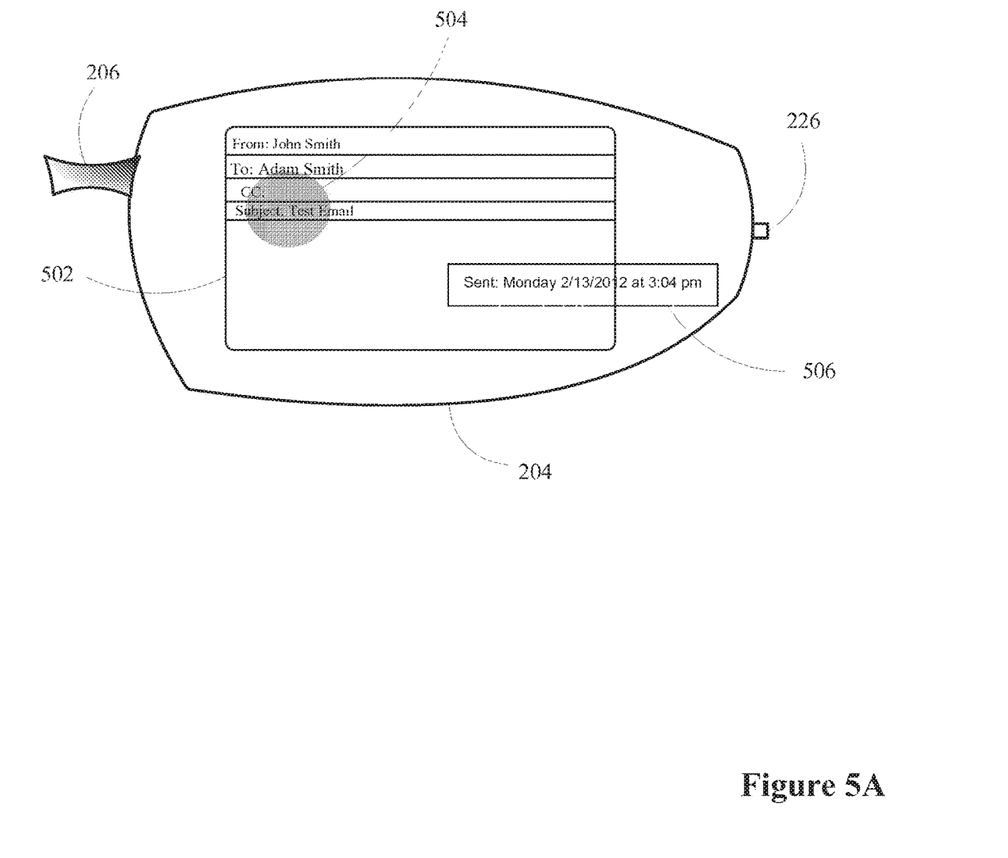
FIGS. 5A-5B collectively depict changes in information density and type on an HMD, in accordance with an example embodiment.

FIG. 5A is an example embodiment of an image of an email 502 displayed on one of lenses 202 and 204. As shown displayed on lens 204, email 502 includes a "From" area, a "To" area, a "CC" area, a "Subject" area, and a "content" area. FIG. 5A illustrates a stare point location 504, which may be determined by computing system 101 to be near the Subject area. Accordingly, upon detection of the staring at the Subject area for a time at least equal to a predetermined amount of time T4, for instance 500 milliseconds, computing system 101 is configured to retrieve the time 506 at which email 502 was send by a sender, and to display it over email 502 or over any other area of lens 204, as shown in FIG. 5A.

Figure 5B:
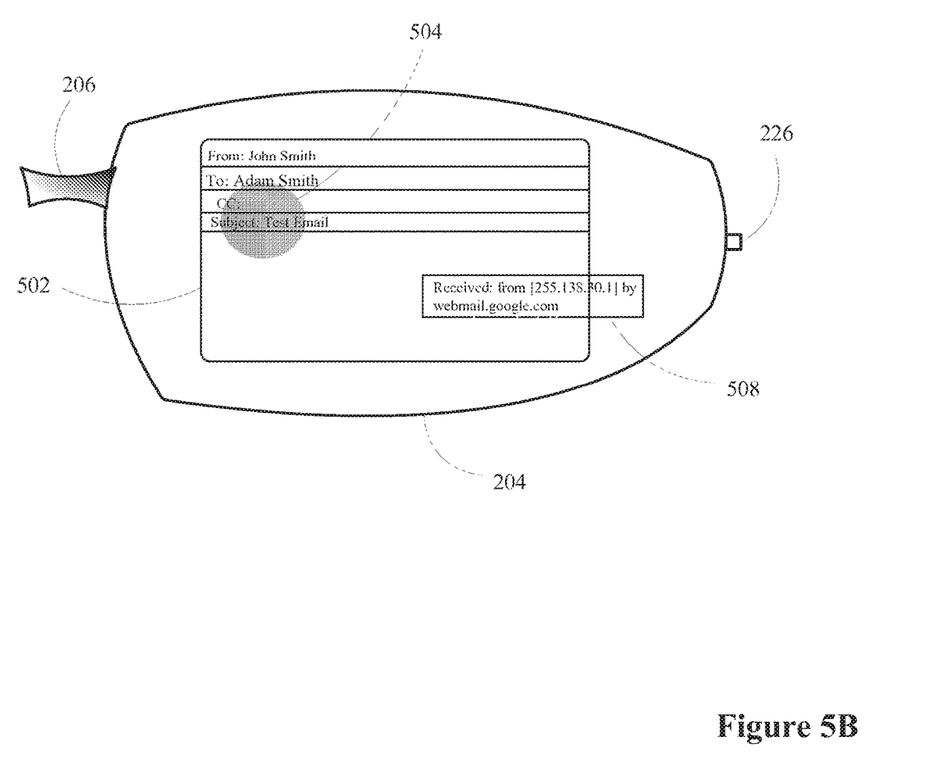

Now referring to FIG. 5B, following the presentation of the retrieved information about email sending time 506, computing system 101 determines whether the HMD wearer continues staring at email 502. If the continued stare is determined to last longer than another length of time T5 subsequently to length of time T4, computing system 101 is configured to identify additional information relevant to email 502. For example, the additional information may include more details about email 502, such as a portion of its email header that discloses who the real sender of email 502 was. As such, computing system 101 is configured to retrieve the header information, and presents on lens 204 an Internet Protocol (IP) address 508 of the sender.

In another example embodiment, the HMD wearer may be strolling through a zoological park and posing in front different animal holding areas or cages. When the HMD wearer stops to look at a particular animal, the wearer's eyes may be imaged by infrared cameras 224 and 226 and found by computing system 101 to be staring at the particular animal. In this scenario, computing system 101 is configured to capture an image of the particular animal. Based on the captured image and on a staring duration that lasts at least as long as a predetermined amount of time T6, computing system 101 may retrieve information about the particular animal.

Following the presentation of the retrieved information about the particular animal, computing system 101 determines whether the HMD wearer continues staring the particular animal. If the continued stare is determined to last longer than another length of time T7 subsequently to length of time T6, computing system 101 may be configured to identify additional information relevant to the particular animal, such as for example its muscular system. Following the presentation of the muscular system of the particular animal, computing system 101 determines whether the HMD wearer continues staring the particular animal. If the continued stare is determined to last longer than another length of time T8 subsequently to length of time T7, computing system 101 may be configured to identify additional information relevant to the particular animal, such as for example its skeletal system. As such, the longer the gaze the more information at the particular animal is identified and presented to the HMD wearer.

4. Non-Transitory Computer Readable Medium

Figure 6:
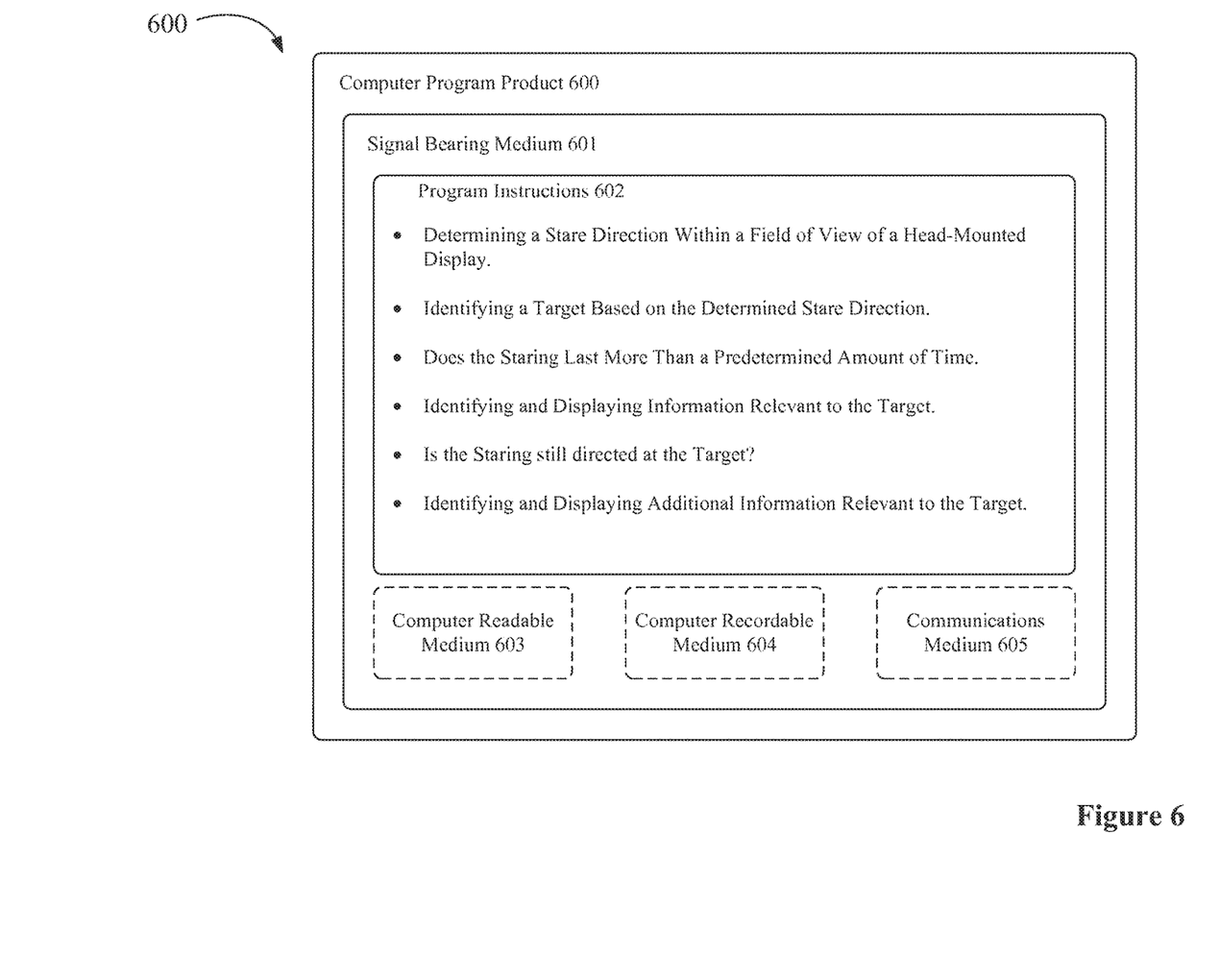
FIG. 6 is a schematic diagram illustrating a conceptual partial view of an example computer program associated with the method of FIG. 3.

In some embodiments, the disclosed methods may be implemented as computer program instructions encoded on a computer-readable storage media in a machine-readable format. FIG. 6 is a schematic illustrating a conceptual partial view of an example computer program product 600 that includes a computer program for executing a computer process on a computing device, arranged according to at least some embodiments presented herein. In one embodiment, the example computer program product 600 is provided using a signal bearing medium 601. The signal bearing medium 601 may include one or more programming instructions 602 that, when executed by one or more processors may provide functionality or portions of the functionality described above with respect to FIG. 1-5B. Thus, for example, referring to the embodiment shown in FIG. 3, one or more features of blocks 302, 304, 306, 308, 310, and/or and 312 may be undertaken by one or more instructions associated with the signal bearing medium 601.

In some examples, the signal bearing medium 601 may encompass a non-transitory computer-readable medium 603, such as, but not limited to, a hard disk drive, a Compact Disc (CD), a Digital Video Disk (DVD), a digital tape, memory, etc. In some implementations, the signal bearing medium 801 may encompass a computer recordable medium 604, such as, but not limited to, memory, read/write (R/W) CDs, R/W DVDs, etc. In some implementations, the signal bearing medium 801 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device 102 of FIG. 1 may be configured to provide various operations, functions, or actions in response to the programming instructions 602 conveyed to the computing device 102 by one or more of the computer readable medium 603, the computer recordable medium 604, and/or the communications medium 605.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computing device comprising:
 a graphical display device;
 a memory device storing program instructions; and
 at least one processor configured to execute the program instructions, wherein the program instructions are executed to perform functions comprising:
  detecting a first direction of a first stare within a field of view associated with the graphical display device;
  identifying a target based on the detected first direction;
  determining that a time duration of the first stare is greater than or equal to a first predetermined time threshold and responsively: identifying information relevant to the target and displaying the identified information on the graphical display device;
  subsequent to the displaying of the identified information, detecting a second stare that is directed at the target or at the displayed identified information, wherein the second stare occurs within a predetermined period of time after the determination that the time duration of the first stare is greater than or equal to the first predetermined time threshold; and
  determining that a time duration of the second stare is greater than or equal to a second predetermined time threshold and responsively: identifying additional information relevant to the target and displaying the additional information on the graphical display device.

2. The computing device of claim 1, wherein detecting the first direction of the first stare comprises:
 obtaining at least one image of each eye of a wearer of the graphical display device; and determining the first stare direction from the at least one image of each eye.

3. The computing device of claim 2, further comprising an infrared light source and a camera, wherein obtaining the at least one image of each eye of the wearer of the graphical display device comprises:
 illuminating each eye with the infrared light source; and
 imaging each eye with the camera.

4. The head-mountable device of claim 1, wherein identifying the target comprises:
 capturing an image of the target; and
 performing a target recognition based on the captured image.

5. The computing device of claim 1, wherein the graphical display device comprises a head mountable display unit.

6. The computing device of claim 5, wherein the head-mountable display device comprises a see-through display unit.

7. The computing device of claim 1 wherein the functions further comprise:

progressively displaying more additional information about the target while the stare continues.

8. A computing device comprising:
a communication interface operable for wireless communications with a second computing device having a graphical display interfaces;
a memory device storing program instructions; and
at least one processor configured to execute the program instructions, wherein the program instructions are executed to perform functions comprising:
receiving eye data based on eye sensor data captured at the second computing device;
based on a first portion of the eye sensor data, detecting a first direction of a first stare within a field of view associated with the graphical display device;
identifying a target based on the detected direction;
determining that a first time duration of the stare is greater than or equal to a first predetermined time threshold and responsively: identifying information relevant to the target and sending a message indicating to display the identified information on the graphical display device;
based on a second and subsequent portion of the eye sensor data, determining that a second time duration of a second stare is greater than or equal to a second predetermined time threshold, wherein the first stare and the second stare are contiguous; and
in response to the determination that the second time duration of the second stare is greater than or equal to the second predetermined time threshold, identifying additional information relevant to the target and sending a message indicating to display the additional information on the graphical display device.

9. The computing device of claim 8, wherein detecting the direction of the stare comprises:
obtaining at least one image of each eye of a wearer of the graphical display device; and
determining the stare direction from the at least one image of each eye.

10. The head-mountable device of claim 8, wherein identifying the target comprises performing a target recognition on image data to detect the target.

11. The head-mountable device of claim 8, wherein the computing device is a mobile phone, a laptop computer, a tablet computer, or a body-wearable computing device, and wherein the second computing device is a head-mountable computing device comprising a near-eye display.

12. The head-mountable device of claim 8, wherein the functions further comprise:
progressively displaying more additional information about the target when staring continues to be detected for at least a third threshold period of time after the determination that the second time duration of the stare is greater than or equal to the second predetermined time threshold.

13. A method comprising:
detecting, by a computing device, a first direction of a first stare within a field of view associated with a graphical display device;
identifying, by the computing device, a target based on the detected first direction;
determining, by the computing device, that a time duration of the first stare is greater than or equal to a first predetermined time threshold and responsively: identifying information relevant to the target and causing the identified information to be displayed on the graphical display device;
subsequent to the display of the identified information, the computing device detecting a second stare that is directed at the target or at the displayed identified information, wherein the second stare occurs within a predetermined period of time after the determination that the time duration of the first stare is greater than or equal to the first predetermined time threshold; and
determining, by the computing device, that a time duration of the second stare is greater than or equal to a second predetermined time threshold and responsively: identifying additional information relevant to the target and causing the additional information to be displayed by the graphical display device.

14. The method of claim 13, wherein detecting the first direction of the first stare comprises:
obtaining at least one image of each eye of a wearer of the graphical display device; and
determining the first stare direction from the at least one image of each eye.

15. The method of claim 14, wherein obtaining the at least one image of each eye of the wearer of the graphical display device comprises:
illuminating each eye with an infrared light source; and
imaging each eye with a camera.

16. The method of claim 13, wherein identifying the target comprises:
capturing an image of a field of view corresponding to the graphic display device; and
performing a target recognition based on the captured image, wherein the target recognition results in detection of the target.

17. The method of claim 13, wherein the computing device comprises a head mountable computing device, and wherein the graphical display device is disposed on the head mountable computing device.

18. The method of claim 13, wherein the graphical display device is disposed on a head mountable computing device communicatively coupled to the computing device, and wherein the computing device comprises a mobile phone, a tablet computer, a laptop computer, or a body-wearable computing device.

19. The method of claim 13, further comprising:
progressively displaying more additional information about the target while the stare continues.

* * * * *